United States Patent
Ninomiya

(10) Patent No.: US 6,647,501 B1
(45) Date of Patent: Nov. 11, 2003

(54) POWER SAVE CONTROL DEVICE AND CONTROL METHOD

(75) Inventor: Ryoji Ninomiya, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/551,582

(22) Filed: Apr. 18, 2000

(30) Foreign Application Priority Data

Apr. 19, 1999 (JP) ............................................. 11-110332

(51) Int. Cl.[7] ................................................. G06F 1/32
(52) U.S. Cl. ...................................................... 713/320
(58) Field of Search ........................ 713/300, 320–324

(56) References Cited

U.S. PATENT DOCUMENTS

| 5,389,952 A |   | 2/1995  | Kikinis |        |
|-------------|---|---------|---------|--------|
| 5,517,649 A |   | 5/1996  | McLean  |        |
| 5,648,799 A |   | 7/1997  | Kikinis |        |
| 5,821,924 A |   | 10/1998 | Kikinis et al. |  |
| 5,892,959 A | * | 4/1999  | Fung | 713/323 |
| 5,920,727 A | * | 7/1999  | Kikinis et al. | 713/323 |
| 5,948,105 A | * | 9/1999  | Skurnik et al. | 713/323 |
| 6,079,025 A | * | 6/2000  | Fung | 713/323 |
| 6,167,524 A | * | 12/2000 | Goodnow et al. | 713/300 |
| 6,193,422 B1 | * | 2/2001 | Belt et al. | 713/320 |

FOREIGN PATENT DOCUMENTS

| JP | 08-202468 | 8/1996 |
|----|-----------|--------|
| JP | 10-187084 | 7/1998 |

* cited by examiner

Primary Examiner—Thomas M. Heckler
(74) Attorney, Agent, or Firm—Finnegan, Henderson, Farabow, Garrett & Dunner, L.L.P.

(57) ABSTRACT

A power supply controller measures electrical power consumed by information processing apparatus. An embedded controller passes the data to power management utility software each time a specified length of time is elapsed. The utility software accumulates a difference as found between this consumed power level and a predetermined reference value. The utility software shifts the information processing apparatus into its power-save modes when the accumulated value becomes larger than the predetermined value.

14 Claims, 7 Drawing Sheets

FIG. 2

| Operation Mode | CPU-OFF Backlight-OFF HDD-OFF | Idle State (CPU-OFF Backlight-ON HDD-OFF) | LCD Access (CPU-ON Backlight-ON HDD-OFF) | CPU-ON Backlight-ON HDD-ON |
|---|---|---|---|---|
| Power Consumed | 5 W | 9.1 W | 18.0 W | 18.1 W |

| Operation Mode | DVD Playback | CRT Access (CPU-ON Backlight-OFF HDD-ON) | During Word-Processing |
|---|---|---|---|
| Power Consumed | >20 W | 14.0 W | ~12 W |

POWER SAVE CONTROL DEVICE AND CONTROL METHOD

BACKGROUND OF THE INVENTION

1. Field of the Invention

This invention relates to a power supply control architectures for use in information processing equipment and, more particularly, to power save control techniques.

2. Description of the Related Art

In recent years, as information processing apparatuses decrease in size and thickness, portable information processing equipment hand-carriable by users, such as, so called notebook personal computers, becomes important more and more in the market and has widely spread in today's business scenes. In those circumstances where AC power is not available, the information processing equipment typically including such notebook computers will be electrically driven by rechargeable batteries loaded therein. It will be desirable for most users that the information processing equipment run longer before the battery runs down.

An approach to lengthening or maximizing the battery drive time period is to precisely manage or control the electrical power being consumed by a monitor display device of the information processing equipment. One typical power-saving control/management scheme has been disclosed in International Patent Publication No. 508831/1996. A power-save control disclosed in the Publication is designed to put a display device into a low power-driven mode after an input device of the information processing equipment is kept inactive for a predetermined length of time period. More practically, the related art equipment uses a timer to monitor or "watchdog" the operation state of the input device for setting the display device to its power save mode.

Power-saving control in prior known information processing apparatus indirectly deals with electrical power being presently consumed by the apparatus. For instance, the power-saving control sets the apparatus into power-save modes in cases where any inputs from an associative input device are absent for a predetermined time period. However, this related art approach does not reflect the exact consumptive power of such apparatus directly.

The related art approach lacks any means for directly monitoring the consumptive power state of the information processing equipment. The related art is an "indirect" power saving control technique.

SUMMARY OF THE INVENTION

It is therefore an object of the present invention to provide improved electronic equipment. It is a particular object of the present invention to provide a power save control device for use in electronic equipment with a plurality of operation modes different in consumptive power. In accordance with one aspect of the present invention, the foregoing objects among others, are achieved by providing an electronic equipment comprising means for measuring electric power consumed by the electronic equipment and means for switching between the plurality of operation modes based on a predefined condition of the consumed electric power.

It is also an object of the present invention to provide an improved power save control method for use with electronic equipment having a plurality of operation modes different in consumptive power.

In accordance with one aspect of the present invention, the foregoing objects among others, are achieved by providing a power save control method comprising the steps of a step of measuring electrical power being consumed by the electronic equipment, and changing an operation mode to another operation mode based on a predefined condition of the consumed electric power.

It is also an object of the present invention to provide an improved information processing apparatus having a plurality of operation modes different in consumptive power.

In accordance with one aspect of the present invention, the foregoing objects among others, are achieved by providing an information processing apparatus comprising means for measuring electrical power consumed by the information processing apparatus, means for determining whether it satisfies a predefined condition in accordance with the consumed electric power measured by the measurement means, and means for switching between the plurality of operation modes based on a predefined condition of the consumed electric power.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings, wherein:

FIG. 2 is a table showing operation conditions and corresponding values of power consumption of the computer system in accordance with each embodiment of the present invention;

DETAILED DESCRIPTION OF THE PREFERRED EMBODIMENTS

Figure 1:
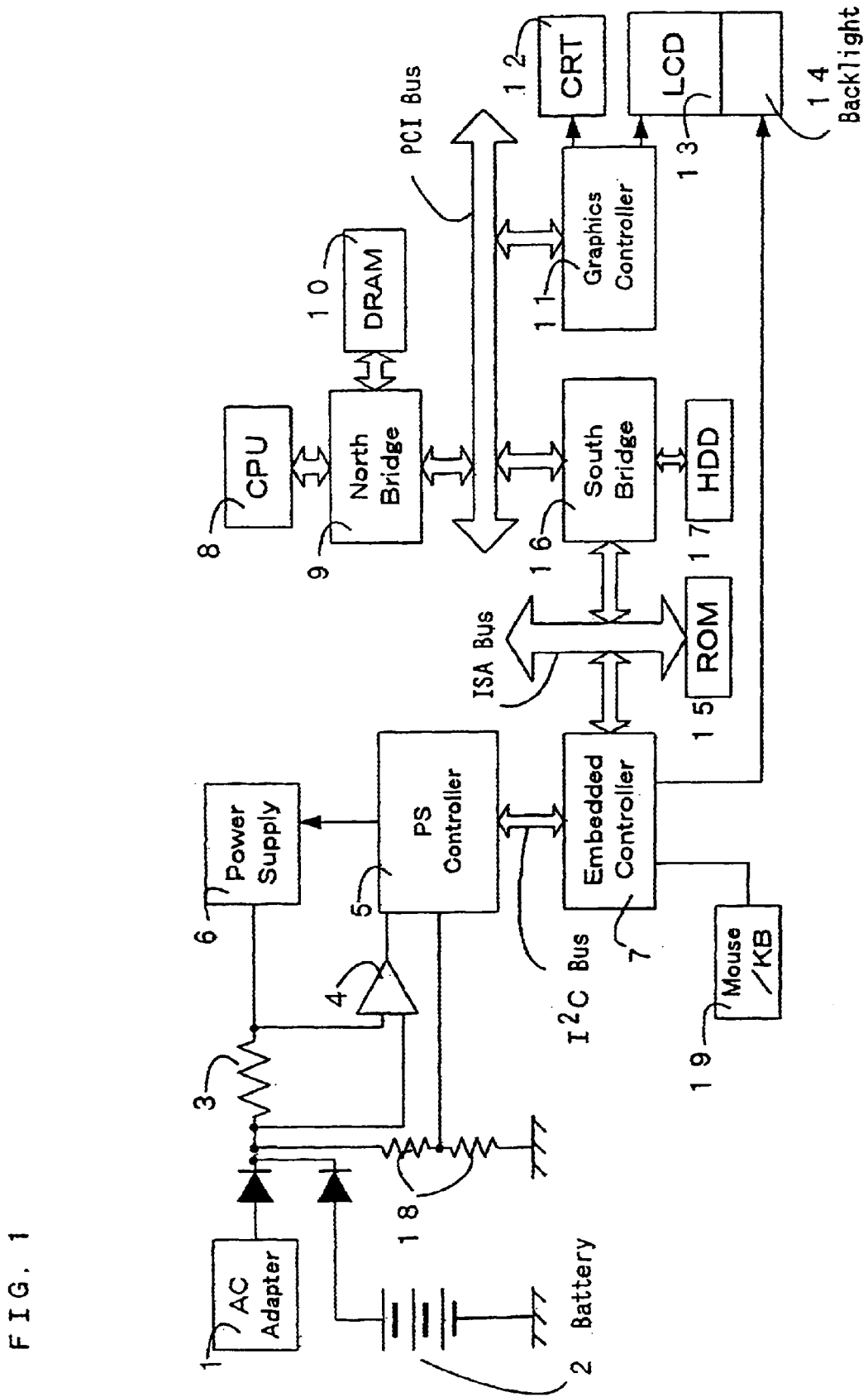
FIG. 1 is a block diagram showing a system configuration of a computer system in accordance with one embodiment of the present invention.

FIG. 1 shows a configuration of a notebook type computer system, which is one example of a computer system in accordance with each embodiment of the present invention. When an attempt is made to electrically drive the illustrative computer system by an alternate current (referred to as "AC" hereinafter) power supply, an AC adapter 1 is used. A battery unit 2 is alternatively used as the power supply. We can use battery unit 2 in cases where any AC power supply is not available by use of AC adapter 1. A current detection resistor 3 detects a current being supplied from these power supplies to the system. A current amplifier 4 amplifies a voltage generated at the both ends of current detection resistor 3 for transmission to power supply controller 5.

Power supply controller 5 includes a built-in analog-to-digital (referred to as "AD" hereinafter) converter (not shown), which is operable to read a current as output from current amplifier 4 and/or a voltage occurring at a voltage division resistor 18. Power supply controller 5 sends forth the resulting readout voltage/current to an embedded controller (referred to as "EC" hereinafter) 7 as a system voltage/current data at regular time intervals. Data delivery between power supply controller 5 and EC 7 is carried out via a certain data bus, so called "I$^2$C" bus.

A power supply (referred to as "PS" hereafter) 6 generates from the voltages as supplied from the AC adapter 1 or battery pack 2 voltages preferably of 5 volts (V) and 3.3 V. Computer systems require those voltages to drive themselves. Power supply controller 5 performs power turn-on/off controlling of PS 6.

EC 7 stores the system voltage/current data as sent from power supply controller 5. EC 7 also generates a system management interrupt (referred to as "SMI" hereinafter) signal or signals to notify a host central processor unit (referred to as "CPU" hereinafter) 8 of the fact that the system voltage/current data has been sent from power supply controller 5. EC 7 connects to an industry standard architecture (referred to as "ISA" hereinafter) bus and sends/receives data to/from host CPU 8. EC 7 also functions as a keyboard controller (referred to as "KBC" hereinafter). The KBC is an interface controller for receiving input data from an input device including a mouse and/or keyboard (KB) 19 then passing it to host CPU 8.

Host CPU 8 controls of an operation of the entire part of this system and also of data processing required therein. A north bridge circuit 9 achieves the bridge function for bidirectional interconnection between host CPU 8 and its associative components, typically including a dynamic random access memory (referred to as "DRAM" hereinafter) 10 and peripheral component interface (referred to as "PCI" hereinafter) bus as described below. North bridge 9 is configured from a gate array. DRAM 10 is the main memory of the computer system. DRAM 10 is also useable by a power control/management utility software as discussed below. DRAM 10 also includes a system management RAM (referred to as "SMRAM" hereinafter).

The computer system uses a graphics controller 11 to display image data. Graphics controller 11 sends image data to any one of a cathode ray tube (referred to as "CRT" hereinafter) monitor unit 12 or a liquid crystal display (referred to as "LCD" hereinafter) panel 13. LCD 13 is used as a standard display device of this computer system. Graphics controller 11 controls certain functionality of electrical power saving of CRT 12. LCD 13 uses a back-light unit 14. Back-light 14 is the device that gives off rays of light for illumination of LCD 13 from its back side. Back-light 14 improves on-screen image viewability or visual recognizability of LCD 13. Power save control executes the control of electrical power consumed by back-light 14 when LCD 13 is used as the display device.

A read-only memory (referred to as "ROM" hereinafter) 15 stores therein the basic input/output system (referred to as "BIOS" hereinafter) of the computer system. ROM 15 also stores the power management utility software for achievement of the functionalities of the present invention. South bridge circuit 16 accomplishes a bridge function for bidirectional interconnection between the PCI bus and ISA bus. South bridge 16 is configured from a gate array. South bridge 16 includes a built-in integrated drive electronics (referred to as "IDE" hereinafter) controller. The IDE controller performs the control of a hard disk drive (referred to as "HDD" hereinafter) module 17, which is for use as a data storage device. South bridge 16 also includes a time-measurement clock generator. HDD 17 is a storage/playback device for data and application programs such as word-processing software programs or the like. KB 19 is an input device for permitting users to input data or commands to the computer system.

Upon start-up of software such as word-processing software or the like by a user, the user performs certain inputting from KB 19. Then host CPU 8 operates to read the program of such word-processing software out of HDD 17 and execute required processing tasks with use of DRAM 10.

Electrical power consumed by the system comprising these devices is explained with reference to FIG. 2. FIG. 2 is a table showing some possible combinations of selected ones from among major parts or components. Consumed power varies in accordance with a status of the system.

The computer system consumes 5 watts (W) while CPU 8, HDD 17, and back-light 14 are rendered inactive—i.e. set in the OFF state. When causing back-light 14 to turn on under such condition, the resultant consumptive power becomes 9.1 W. Back-light 14 per se consumes power of approximately 4 W. These conditions are the state in which respective constituent components are not used maximally. On the other hand, when back-light 14 turns on while CPU 8 is at or near its full performance level, the consumptive power becomes 18.0 W. When the CPU 8 is at its full or maximal power, its consumed power can reach about 7 W. Consumed power of peripheral circuitry also increases. When additionally providing access to HDD 17 in this state, the power dissipation might further increase up to 18.1 W. In those computer systems which have a built-in digital versatile disk (referred to as "DVD" hereinafter) drive (not shown), power consumption increases beyond 20 W while playing back video images using such a DVD drive. These conditions are such that the consumptive power becomes also greater at respective power-eating components.

Certain cases are available between a relatively less power consumption state and a relatively significant state. One such case is the case of performing visual displaying on an external display device such as CRT 12 without making use of back-light 14. Another case is the case of using a word-processing software. In the first case, CRT 12 is made active for visualization of on-screen images while back-light 14 is turned off. The consumptive power becomes 14.0 W. In the second case, power dissipation becomes about 12 W. The value 12 W occurs when the CPU 8 does not treat excessive load and the back-light 14 is in the ON state for performing on-screen image displaying.

In case a user uses the system, power consumption varies every time the system condition changes. The present invention is accommodatable to such changes in power consumption level. On the basis of the consumptive power values, each embodiment is explained below.

A first embodiment is discussed below. In the first embodiment, the computer system calculates or computes a difference between the value of consumptive power and a predefined reference value. The difference is then subject to accumulation processing by use of an accumulation counter. DRAM 10 includes the accumulation counter. When the accumulated value becomes larger than a predetermined threshold value, the computer system determines that conditions are satisfied, then lets the system shift into a power-save mode. The difference calculation, accumulation, and determination are done by the utility software program. The less the consumptive power, the larger the difference relative to the reference value. The accumulated value becomes larger than the threshold value fast.

This illustrative embodiment is a user-friendly power-save control scheme having a specific concept. The concept is based on the user not so frequently using the computer system, and the resultant consumptive power stays lower in level. The concept contemplates that shifting into the power-save mode while the power dissipation is at low levels and hardly poses any appreciable influence upon the user. It is another advantage of the embodiment that the power-save control reflects the amount of consumed power directly.

Figure 3:
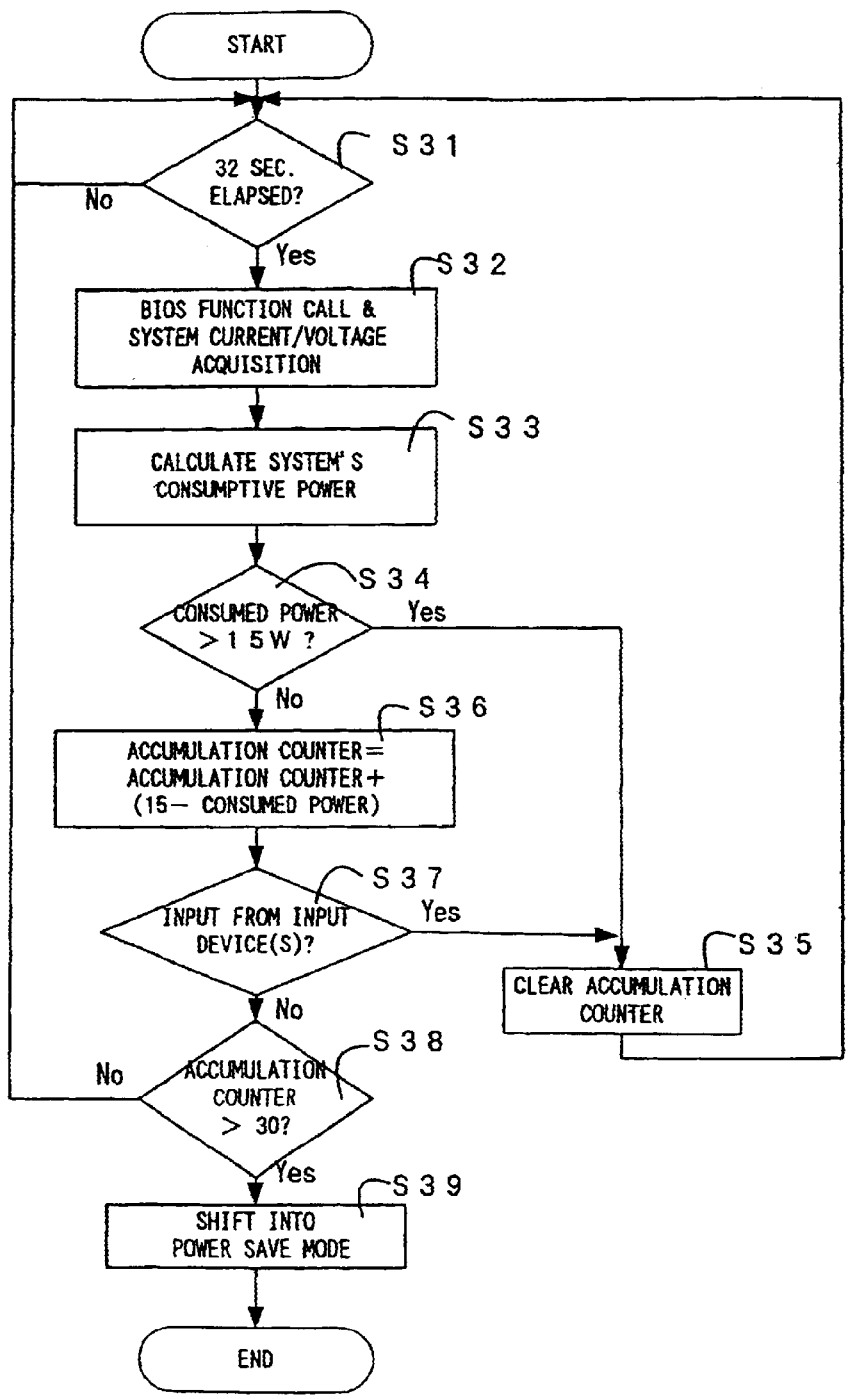
FIG. 3 is a flow chart for illustrating an operation of a first embodiment of the present invention to control operating modes.

An operation of the first embodiment is explained in conjunction with a flow chart of FIG. 3 below. The power management utility software program determines whether a specified length of time has been elapsed (step S31). A time measurement clock within south bridge 16 measures the specified length of time. The time length is 32 seconds in the embodiment. Users can modify the value of 32 seconds on a case-by-case basis. In cases where users require more precise time control, this time period may be shortened. If minimization of the load to the system is the first priority then this time is lengthened thus reducing or dropping down the frequency of calculation events.

The utility software determines whether a specified length of time has elapsed (step S31). If it has elapsed, then the procedure proceeds to step S32. If it has not elapsed, then the procedure returns to step S31.

If such 32-second time is not yet elapsed ("NO" at step S31), then the power control procedure returns to step S31. If 32 seconds have elapsed then the utility software attempts to call the BIOS function. The utility software acquires from EC 7 those information items about the current/voltage of the system ("YES" at step S31 to step S32) with the BIOS function. As previously stated, the power supply controller 5 reads the current/voltage information items of the system. The power supply controller 5 acquires the information with current detection resistor 3 and current amplifier 4 and voltage division resistor 18. Then the power supply controller 5 passes the information to EC 7. The utility software obtains the information as presently stored in EC 7 at a time point when the BIOS function was called at step S32.

Subsequently, the utility software uses the current/voltage information obtained at step S32 to calculate the value of power being consumed by the system (step S33). The utility software then determines whether this calculated consumptive power value is in excess of a specified value, here 15 W (step S34). If the power consumption exceeds 15 W, then the utility software clears or resets the accumulation counter ("YES" at step S34 to step S35). After clearing, the procedure goes to the first step S31 again.

When the value of consumed power is less than 15 W, the utility software substitutes a new or updated value to the accumulation counter ("NO" at step S34 to step S36). The new value is equal to a present storage value of the accumulation counter added to the value of a difference between fifteen (15) and the consumptive power value. In this embodiment, the specific numerical value of 15 W is employed as a reference value at the above steps S34 and S36. The reference value may be set at any other appropriate values in view of the system's power consumption level and also in deference to the user's preferences. This embodiment operates under an assumption that the power-save control technique is for use during in-use of a word-processing software, and the reference value is set at 15 W.

Subsequently, the utility software program determines whether an input is present or absent from the input device such as KB 19 (step S37). When input is present from the input device, EC 7 sends certain interruption to CPU 8. The utility software determines that it is not adequate to let the system shift into the power save mode and then clears the accumulation counter ("YES" at step S37 to step S35). After clearing the accumulation counter, the procedure proceeds to the first step S31 again. If any inputs are absent from the input device, then the utility software determines whether the present value of the accumulation counter is larger than a predetermined threshold value of 30 (step S38).

If the value of the accumulation counter stays less than 30 ("NO" at step S38), the utility software determines that shifting to the power save mode is not yet adequate and then the procedure proceeds to step S31. If the value of the accumulation counter is larger than 30, the utility software determines that the system should shift into the power save mode ("YES" at step S38 to S39). The power save mode shifting is achievable with dropping down the power relative to the display device such as CRT 12 and/or LCD backlight 14. This power save mode shifting is also achievable with changing the rotation mode of the HDD or letting the CPU change in operation mode.

The threshold value is 30 in this embodiment. The threshold value can be freely modified or altered in accordance with the actual value of system power consumption and/or user's preferences. The more significant this value, the more difficult the power-save mode shiftability—namely, the system rarely shifts into its low-power or no-power mode.

If an inactive or "idle" state continues in the system, an incremental value of three (3) is added to the accumulation counter once at a time whenever 32 seconds are elapsed. The value of the accumulation counter becomes larger than the value 30 after elapse of approximately 320 seconds—that is, about five minutes and twenty seconds later. Thus, the system will shift into the power save mode after such time duration. However, the time period to shift into the power save mode depends upon the actual instant of time measurement startup. Even if any input are absent, the system can vary in power dissipation level. The above-identified time value can change in accordance with the power consumption. The embodiment enables a successful power save control reflecting the power consumption directly.

A second embodiment is explained below. In the second embodiment, the power management utility software program directly uses the value of consumptive power for accumulation. Power supply controller 5 measures the value of consumptive power. DRAM 10 includes the accumulation counter. In case the accumulated value becomes larger than a prespecified threshold value, the utility software determines that the criteria is satisfied. Then the utility software shifts the system into a power save mode. The greater the consumptive power, the faster the accumulated value exceeds the threshold value. On the contrary to the case of the first embodiment stated supra, the greater the power consumption, the faster the system shifts into the power save mode.

The second embodiment is particularly useful in those cases where the in-use time period of a computer system on battery power is made as long as possible. One of those environments is that the computer is used outdoors and thus AC sources are not easily available. The second embodiment is the power saving control that directly reflects the amount of electrical power consumed. Users can choose one of the first and second embodiments in deference to their preferences on a case-by-case basis.

Figure 4:
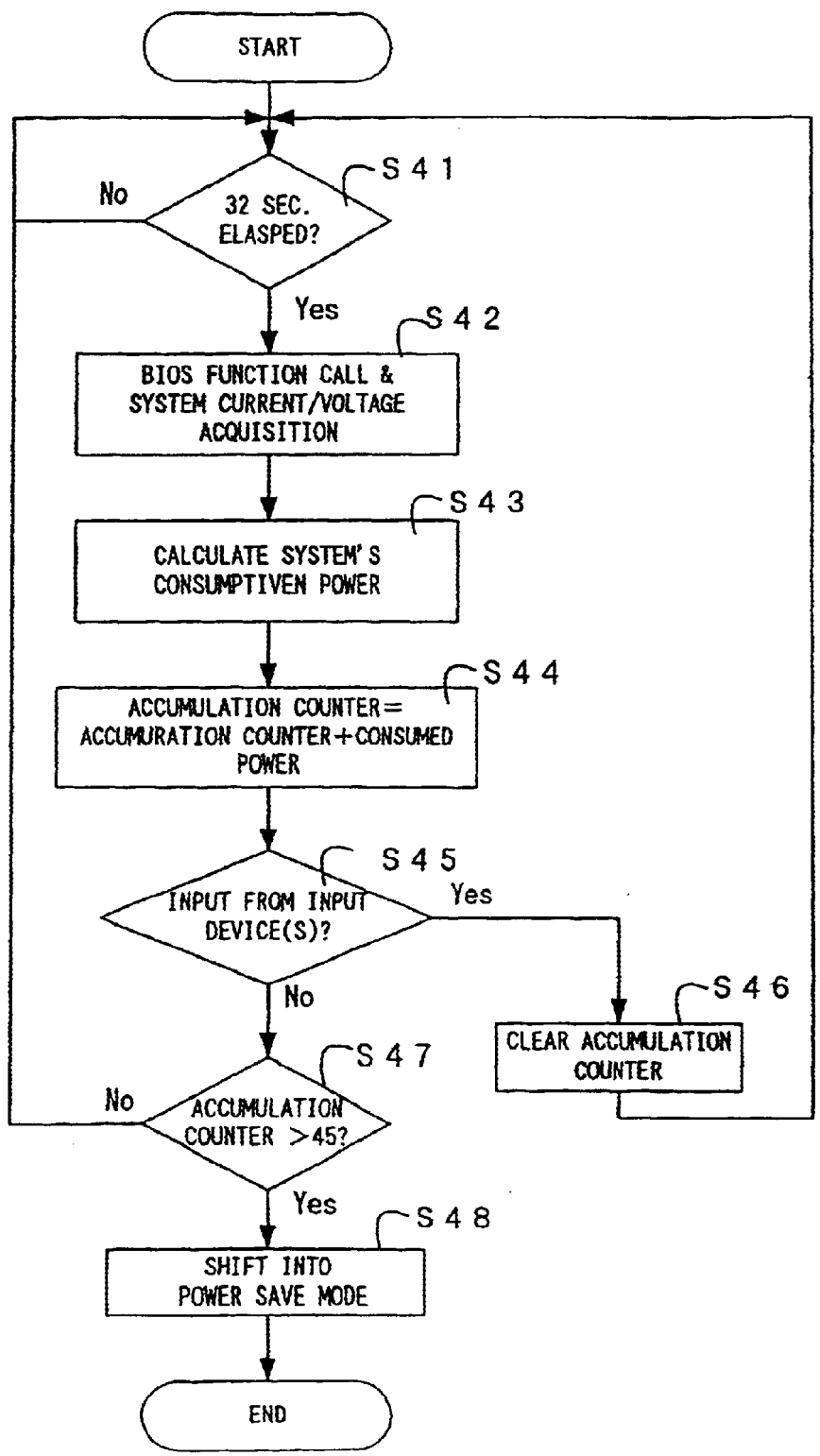
FIG. 4 is a flow chart for illustrating an operation of a second embodiment of the invention to control operating modes.

An operation of the second embodiment is explained with reference to a flow chart of FIG. 4. The power management utility software program determines whether a specified time of 32 seconds has elapsed (step S41). A time measurement clock built into the south bridge 16 measures the specified time. As in the first embodiment, the value of 32 seconds is modifiable by users on a case-by-case basis. If precise or fine control is required at shortened time intervals, then this time value may be decreased. If system load reduction or minimization is the first priority then this time value is increased thereby dropping down the frequency of computation events.

If such 32-second time is not yet elapsed (NO at step S41), then the control procedure proceeds to step S41. If the 32-second time has elapsed then the utility software attempts to call the BIOS function. The utility software acquires those system current/voltage information items from EC 7 (from YES at step S41 to S42). Power supply controller 5 reads system current/voltage information. Power supply controller 5 acquires the information from current detection resistor 3, current amplifier 4, and voltage division resistor 18. Then power supply controller 5 passes the information to EC 7. The utility software obtains the information as presently stored in EC 7 at a time point when the BIOS function was called at step S42.

Subsequently, the utility software uses the current/voltage information obtained at step S42 to calculate the value of power being consumed by the system (step S43). Then, the utility software sets a new value to the accumulation counter (step S44). The new value is the value that is equal to the accumulation counter's present storage value added with the value of consumptive power.

Subsequently, the utility software determines whether an input is present or absent from the input device such as KB 19 (step S45). When input is present from the input device, EC 7 send certain interruption to CPU 8. The utility software determines that it is not adequate to let the system shift into the power save mode and then clears the accumulation counter ("YES" at step S45 to S46). After clearing the accumulation counter, the procedure returns to the first step S41. If no inputs are present from the input device then the utility software determines whether the value of the accumulation counter is larger than a predetermined threshold value, here 45 ("NO" at step S45 to step S47).

If the value of the accumulation counter stays less than 45 ("NO" at step S47), the utility software determines that transition to the power save mode is not yet adequate and then the procedure proceeds to step S41 again. If the accumulation counter value is larger than 45 then the utility software shifts the system into the power save mode ("YES" at step S47 to S48). As in the first embodiment, this power-save mode shifting is achievable with powering down the associated display device such as CRT 12 and/or LCD backlight 14. This power save mode shifting is also achievable with changing the disk rotation mode of the HDD or letting the CPU change in operation mode.

The threshold value is 45 in the second embodiment. The threshold value is freely modified or altered in deference to the actual value of power consumption of the system and/or user's preferences. The larger the threshold value, the more difficult the power-save mode transition.

If an idle state continues in the system, an incremental value of about twelve (12) is added to the accumulation counter upon elapse of every time interval of 32 seconds. The value of accumulation counter becomes larger than the value 45 after elapse of approximately 96 seconds. The system will shift into the power save mode. However, the time period to shift into the power save mode depends upon the actual instant of time measurement startup. Even if inputs are absent, the system can vary power consumption level. The second embodiment enables a power save control reflecting the power consumption directly.

Selective use of either one of the first embodiment and second embodiment is possible in accordance with the remaining power amount of battery pack 2 shown in FIG. 1. One example is that the first embodiment is employed in cases where the remaining power of battery 2 is affordable or stays sufficient and that it will be switched to the second embodiment when the residual power amount of battery 2 becomes less. With such scheme, if users attempt to use the system with increased power consumption in spite of the shortage of residual battery power, the system quickly enters the power save mode. It is expectable that an effect of warning users of the remaining battery power level.

The first and second embodiments provide a single power save mode. The invention also can treat a plurality of power saving modes. For example, the first embodiment is modifiable as below. The computer system is put into a first power save mode which causes LCD back-light 14 to turn on and HDD 17 to turn off. The computer system keeps the performance of CPU 8 to the extent that CPU 8 is still capable of calculation of consumptive power consumption and/or accumulation processing. The system performs consumptive power measurement, execution of conversion, and accumulation processing. The system shift into a second power save mode when the accumulated value becomes larger than the threshold value "30". To shift into the second power save mode, the system turns CPU 8 off, and reduces the power of both LCD back-light 14 and HDD 17. It reduces the consumptive power down to 5 W or therearound.

In this case, if the threshold value in the first power save mode is the same as the initial threshold value "30", then a difference between the reference value and the power being consumed becomes larger than in the standard mode. The accumulated value in the first power save mode increases beyond the threshold value faster than in the standard mode. So, the system will quickly go into the second power save mode. If there is a more appropriate value than the threshold value "30" in the first power save mode, a new threshold value can be set. In this way, increasing the number of power save modes makes it possible to provide enhanced power save controllability with further precision.

A third and a fourth embodiment are explained below. The third and fourth embodiments relate to an operation of the computer system after shifting to its power save mode in the first and second embodiments. These embodiments vary the specified condition used for shifting to power-save mode in accordance with the length of time elapsed in the power save mode.

If the state of a power saving mode was not continued so long, it will possibly happen that even after the computer system enters its power save mode, it behaves to recover to the standard mode soon. The state corresponds to data/command inputting state or the like. Such recovery to the standard mode from the power save mode would accompany with unexpected occurrence of power consumption. Thus, too frequent mode shifting causes power loss. In the circumstance that such standard mode recovery can occur frequently, it is effective to make the conditions to shift into the power save mode strict.

Adversely, if the power save mode is continued for a longer period of time, it is assumable that this state is such that the system is not rendered so active. In such case, the conditions for shifting to power save mode are set at a moderate level. The computer system can shift into the power save mode within a shortened time period. It is possible to avoid wasting power. The third and fourth embodiments are made with taking these issues into consideration.

These embodiments change certain conditions for shifting the system into its power save mode in accordance with a time length elapsed in the power save mode. The third embodiment renders the threshold value variable. The fourth embodiment renders the length of a time interval variable. The utility software executes the calculation of power being consumed every time interval.

Figure 5:
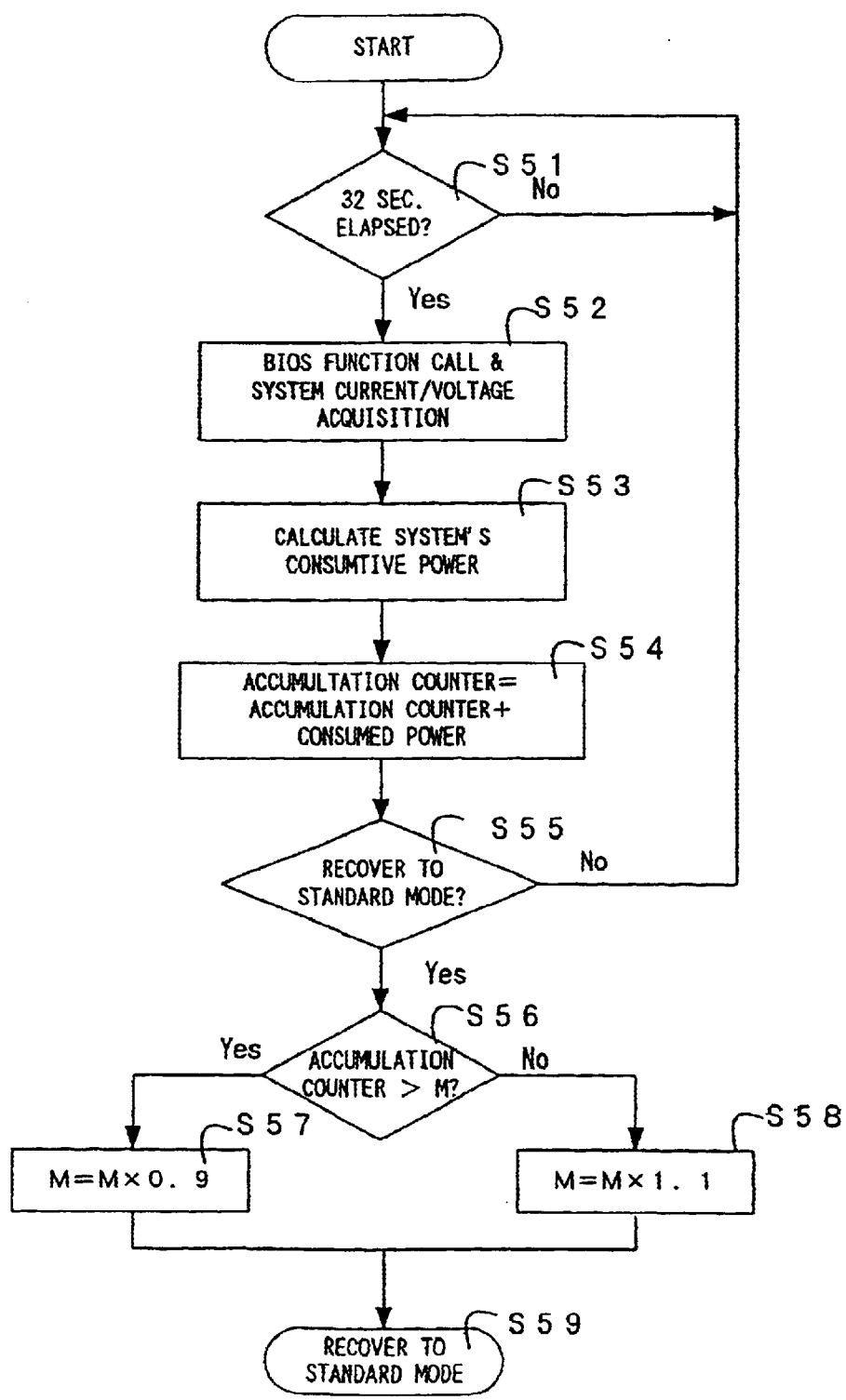
FIG. 5 is a flow chart for illustrating an operation of a third embodiment of the invention to control operating modes.

An operation of the third embodiment is explained with reference to a flow chart of FIG. 5. The third embodiment is under the assumption that it is employed in combination with the first embodiment. At the time point of the flow chart of FIG. 5, the system has already been shifted into its power save mode. The power management utility software program uses the time measurement clock within south bridge 16 to determine whether a specified length of time period—here for example, 32 seconds—has elapsed (step S51). This value of 32 seconds may be simply equal to a time value that has been used in the standard mode.

If such 32-second time period is not yet elapsed ("NO" at step S51), then the procedure proceeds to a step S51 again. If the 32-second time has elapsed already, then the utility software calls the BIOS function to acquire from EC 7 those information items about the current/voltage of the system ("YES" at step S51 to step S52).

The utility software uses the current/voltage information obtained at step S52 to calculate power being consumed by the system (step S53). Then, the utility software sets a new value to the accumulation counter in the save mode (step S54). The computer system can use the accumulation counter in the standard mode as the accumulation counter in the save mode. The computer system also can use a separate counter which is provided in addition to the accumulation counter in the standard mode. The new value equals the accumulation counter's storage value in the power save mode plus the value of calculated consumptive power.

Subsequently, the utility software determines whether or not the system recovers to its standard mode based on inputs from the input device or the like (step S55). If the system does not recover ("NO" at step S55), the procedure proceeds to step S51 again. If the system recovers, the utility software determines if the accumulation counter's value is larger than a specified value "M" (step S56). This value "M" is equal to the threshold value used in the first embodiment. This is "30" as its initial value.

In case the value of the accumulation counter is greater than of "M" ("YES" at step S56), it is presumed that the system is not so active in operation. Thus, the utility software next decreases the threshold value to facilitate the system to go into the power save mode (step S57). In this embodiment, a value equal to "M" multiplied by 0.9 is used as a new threshold value. The threshold value becomes "27" when the system returns to its standard mode in this example. The new threshold value allows the system to readily shift into the power save mode than ever before.

If the accumulation counter's value is less than or equal to the value "M" (if NO at step S56), it is presumed that this state recovers to its standard mode easily. The utility software next increases the threshold value to make more difficult for the system to go into the power save mode (step S58). In this embodiment a specific value equal to "M" multiplied by 1.1 may be used as a new threshold value. The new threshold value becomes "33" once after the system has returned to the standard mode in this example. The new threshold value makes it more difficult to shift into the power save mode than before.

Both cases of S57 and S58, the system recovers to the standard mode after having reset the value of "M" (step S59). Although in this embodiment 0.9 or 1.1 was multiplied in order to change the value "M", this may alternatively be set at other values on a case-by-case basis, such as for example 0.95, 1.05, or others.

Figure 6:
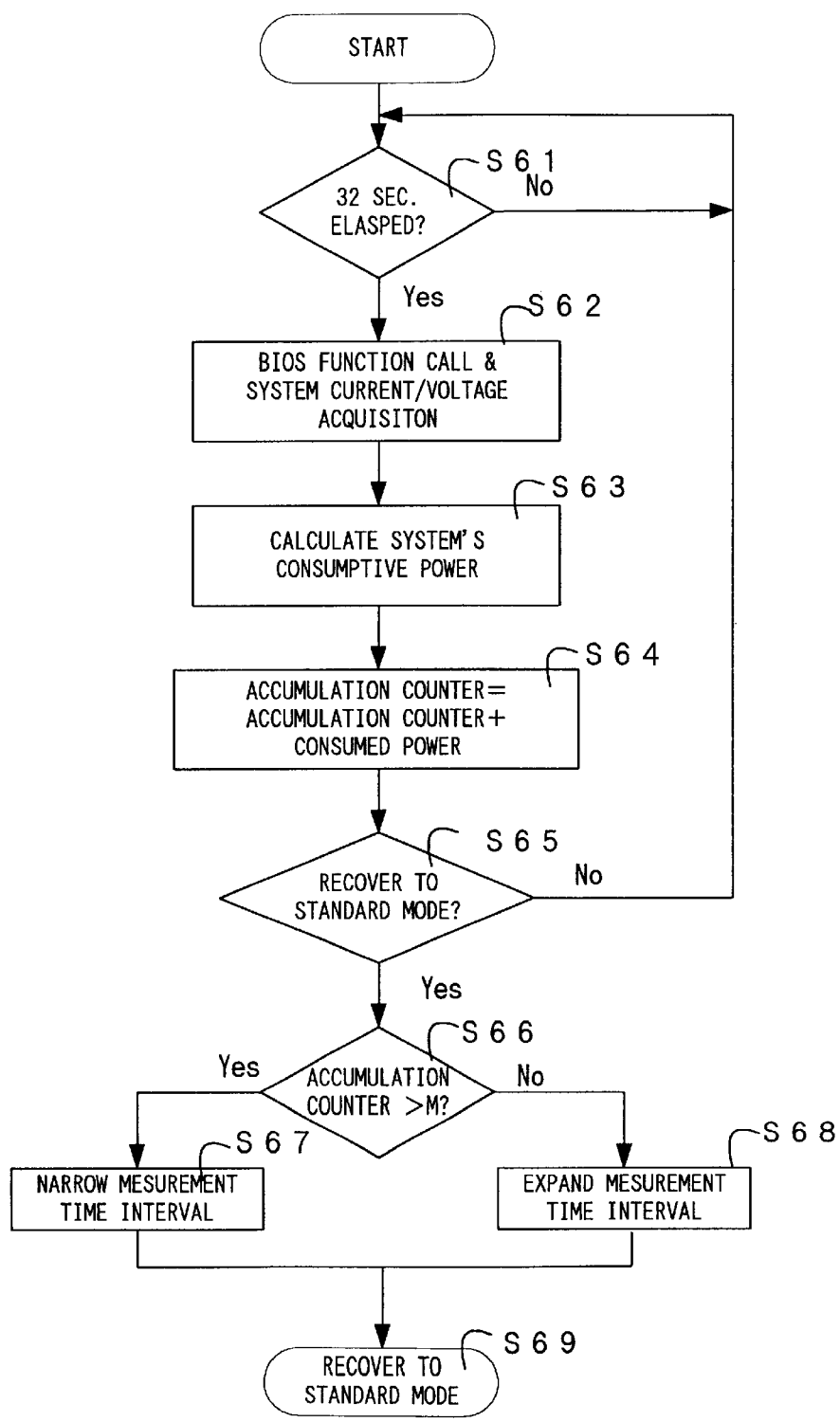
FIG. 6 is a flow chart for illustrating an operation of a fourth embodiment of the invention to control operating modes.

An operation of the fourth embodiment is explained in conjunction with FIG. 6. This embodiment is under the assumption that it is used in combination with the first embodiment. At the time point of the flow chart of FIG. 6, the system has already been shifted into its power save mode. As in the case of the standard mode, the utility software program uses the time measurement clock within the south bridge 16 to determine whether a specified length of time period has been elapsed (step S61). This example value of 32 seconds may simply be equal to a time value that has been used in the standard mode.

If such 32-second time period is not elapsed yet (i.e., if NO at step S61), then the procedure returns to step S61. If the 32-second time has elapsed already, then the utility software calls the BIOS function to acquire from the EC 7 those information items about the current/voltage of the system ("YES" at step S61 to S62).

The utility software uses the current/voltage information obtained at step S62 to calculate power being consumed by the system (step S63). Then, the utility software sets a new value to the accumulation counter in the power save mode (step S64). The computer system can use the accumulation counter in the standard mode as the accumulation counter in the save mode. The computer system also can use a separate counter which is provided in addition to the accumulation counter in the standard mode. The new value equals the accumulation counter's storage value in the power save mode added with the value of calculated consumptive power.

Subsequently, the utility software determines whether the system recovers to its standard mode based on inputs from the input device or the like (step S65). If the system does not recover, the procedure returns to step S61 ("NO" at step S65). If the system recovers, the utility software determines if the accumulation counter's value is larger than a specified threshold value "M" (step S66). This threshold value "M" is equal to the threshold value used in the first embodiment. This threshold value is "30".

If the value of the accumulation counter becomes larger than "M" ("YES" at step S66), it is presumed that the system is not so active in operation. Thus, the utility software next causes a time interval for measurement of power consumption to narrow (step S67). The new time interval facilitates the system to shift into the power save mode. In this embodiment, the new time interval is 16 seconds. The power consumption measurement and accumulation are carried out once at a time whenever 16 seconds are elapsed. The new time interval makes shifting to the power save mode easier than before.

If the accumulation counter's value is less than or equal to the value "M" ("NO" at step S66), it is presumed that this state recovers to its standard mode easily. The utility software next increases the power consumption measurement time interval to become longer than 32 seconds. The new time interval makes it more difficult for the system to shift into the power save mode (step S68). After having returned to the standard mode in this example, the utility software executes consumptive power measurement and accumulation once at a time whenever 64 seconds pass. Thus, it becomes more difficult for the system to shift into the power save mode than before.

Both case of step S67 or S68, the system recovers to the standard mode after having reset the length of measurement time interval (step S69). Any appropriate values can be set to a new measurement time interval on a case-by-case basis.

In these embodiments, the conditions such as the threshold value and the time interval are respectively modified. It is also possible to provide an upper limit and/or lower limit to such modified values. It is also possible to restrict such that the conditions are modified only when the actual value becomes larger than the reference value, or only when the actual value is less than the reference value.

A fifth embodiment is explained with reference to FIG. 7. In the fifth embodiment, the utility software counts up the number of events that certain condition is met. Then the utility software put the system into its power-save mode when the resultant count-up value becomes larger than a prespecified value.

As in the other embodiments, power supply controller 5 operates to monitor consumptive power at specified time intervals for notification to EC 7. The power management utility software calls the BIOS function to pass data from EC 7 to DRAM 10. In addition, the utility software permits DRAM 10 to store information about a threshold value and reference value. DRAM 10 includes a counter that is operatively responsive to the utility software for counting up the number of times that the system's consumptive power becomes less than the reference value. When the system power consumption is kept less, such state will be reflected to this counter as the significance of the number of events. The utility software counts up the state as an event when the actual value becomes less than the reference value.

Figure 7:
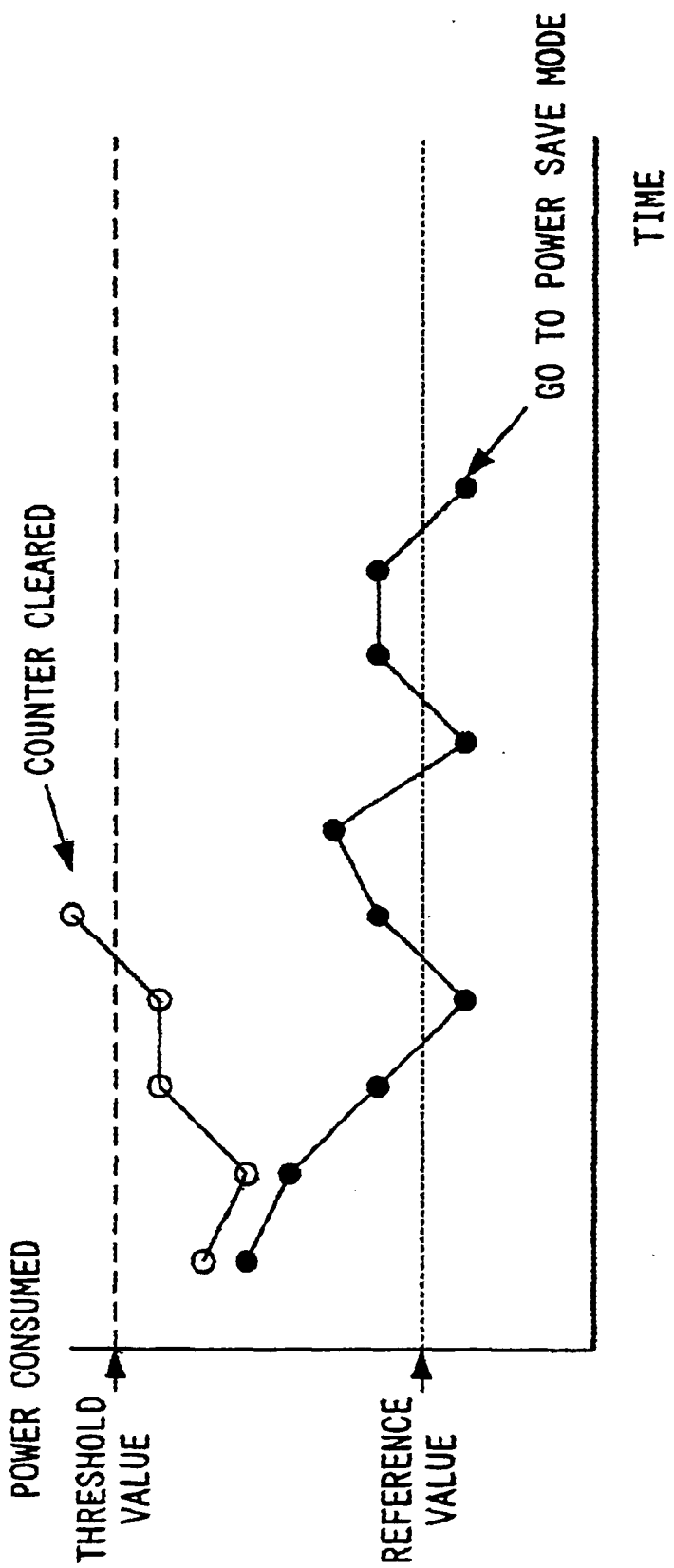
FIG. 7 is a diagram for illustrating an operation of a fifth embodiment of the invention to control operating modes.

FIG. 7 shows a relation of a change in consumptive power value versus transition to the power save mode. The vertical axis of this graph represents the value of consumptive power. The transverse axis indicates time elapse. Balloon-like markings plotted in this graph designate values of consumptive power. EC 7 measures the value at specified time intervals. There are two series in FIG. 7—a series of white balloon-like markings and black ones. Each group of balloon marks are connected by line segments together.

The series of white balloons is an example of the case where the power being consumed by the system is significant. With regard to the first four balloons, the measured value of consumptive power does not become larger than the threshold value and yet does not become less than the reference value. At the fifth while circle point, the value of consumptive power becomes larger than the threshold value. Thus, the utility software clears the counter for re-counting from the beginning.

The series of black circles is an example of the case where the system's consumptive power is less. As per the first three circles, the consumptive power value does not become larger than the threshold value and yet does not become less than the reference value. At the fourth black circle point, the power consumption becomes less than the reference value. The counter establishes its count value at "1". At the following time points, the value does not become larger than the threshold value. At the seventh black circle, it becomes less than the reference value. The counter establishes its count value at "2". During a certain time, the value does not become larger than the threshold value. At the tenth black circle, it becomes less than the reference value. At this time point the counter counts as "3". As the value of the counter reaches "3", for example, the utility software determines that the system's consumptive power is low and thus the system must be in the inactive state. Thus, the utility software puts the system into the power save mode.

In this example, the utility software shifts the computer system into the power save mode because the actual consumptive power value goes below the reference value three times while it does not become larger than the threshold value. If the consumptive power becomes larger than the threshold value even for a single time during such process, the utility software clears the counter to zero (0) and restarts its counting operation from the beginning. The system is no longer in inactive state in such cases. When the consumptive power exceeds the threshold value at the sixth black-circle point in the series of black circle markings in the FIG. 7 graph, the utility software clears the counter's value "1" to "0" and then restarts its countup operation from the beginning.

In this embodiment, users can set up manually the threshold value, the reference value, and the counter value putting the system into its power save mode. The computer system can perform an operation in accordance with users' instructions and demands.

The present invention is not limited in respective ones of the embodiments stated above. The present invention as disclosed herein is especially adaptable for use in portable or handheld information processing apparatus operable on battery power, such that a notebook personal computer.

As has been described above, in accordance with this invention, it is possible to perform power-saving control that directly reflects electrical consumptive power of information processing apparatus.

What is claimed is:

1. A power save control device for use in electronic equipment with a plurality of operation modes each having different consumptive power, comprising:

means for measuring electric power consumed by the electronic equipment;

means for switching between the plurality of operation modes based on a predefined measurement condition of the consumed electric power;

means for determining whether the predefined measurement condition is satisfied; and means for detecting an input from an input device to the electronic equipment, wherein the determining means is initialized when a certain input is detected by the detection means.

2. The power save control device according to claim 1, wherein the determining means carries out the determination once each time a specified length of time is elapsed.

3. A power save control device for use in electronic equipment with a plurality of operation modes each having different consumptive power, comprising:

means for measuring electric power consumed by the electronic equipment;

means for switching between the plurality of operation modes based on a predefined measurement condition of the consumed electric power;

means for determining whether the predefined measurement condition is satisfied;

means for detecting an input from an input device to the electronic equipment, wherein the determining means is initialized when a certain input is detected by the detecting means; and accumulator means for accumulating the consumed electric power measured by the measurement means, wherein the determining means determines that the condition is satisfied when a resultant accumulated by the accumulator means becomes higher than a predetermined threshold value.

4. The power save control device according to claim 3, wherein the accumulator means performs accumulation processing of the consumed electric power through conversion to a difference between the measured power value and a prespecified reference value.

5. The power save control device according to claim 3, wherein the accumulator means continues its operations during the switched operation mode and the determining means modifies the predetermined threshold value in accordance with an accumulation value accumulated during the switched operation mode.

6. The power save control device according to claim 5, wherein the determining means modifies the threshold value to a value less than the threshold value as a new threshold value if the accumulation value accumulated during the switched operation mode is higher than a prespecified value.

7. The power save control device according to claim 5, wherein the determining means modifies the threshold value with setting a value higher than the threshold value as a new threshold value if the accumulation value accumulated during the switched operation mode is lower than a prespecified value.

8. The power save control device according to claim 3, wherein the determining means performs the determination at every specified time period.

9. The power save control device according to claim 8, wherein the accumulator means continues its operations during the switched operation mode and the determining means modifies a specified time period in accordance with an accumulation value accumulated during the switched operation mode.

10. The power save control device according to claim 9, wherein the determining means modifies the time period to a period shorter than the specified time period as a new time period if the accumulation value accumulated during the switched operation mode is higher than a prespecified value.

11. The power save control device according to claim 9, wherein the determining means modifies the time period to a period longer than the specified time period as a new time period if the accumulation value accumulated during the switched operation mode is lower than a prespecified value.

12. A power save control device for use in electronic equipment with a plurality of operation modes each having different consumptive power, comprising:

means for measuring electric power consumed by the electronic equipment;

means for switching between the plurality of operation modes based on a predefined measurement condition of the consumed electric power; and means for storing a predetermined threshold value of consumed electric power and a reference value, wherein the predefined measurement condition equals a predefined number of times the consumed electric power becomes lower than the reference value while the consumed electric power is not in excess of the predetermined threshold value.

13. A power save control method for use with electronic equipment having a plurality of operation modes each having different consumptive power, comprising:

measuring electrical power consumed by the electronic equipment;

calculating a difference between the measured consumed electric power and a predetermined reference value;

accumulating a plurality of the differences to reach an accumulated value; and comparing the accumulated value to a prespecified value, wherein the predefined measurement condition is satisfied when the accumulated value becomes higher than the prespecified value; and changing an operation mode to another operation mode based on a predefined measurement condition of the consumed electric power.

14. The power save control method according to claim 13, further comprising the step of clearing the accumulated value when the consumed electric power becomes higher than the predetermined reference value.

* * * * *